UNITED STATES PATENT OFFICE.

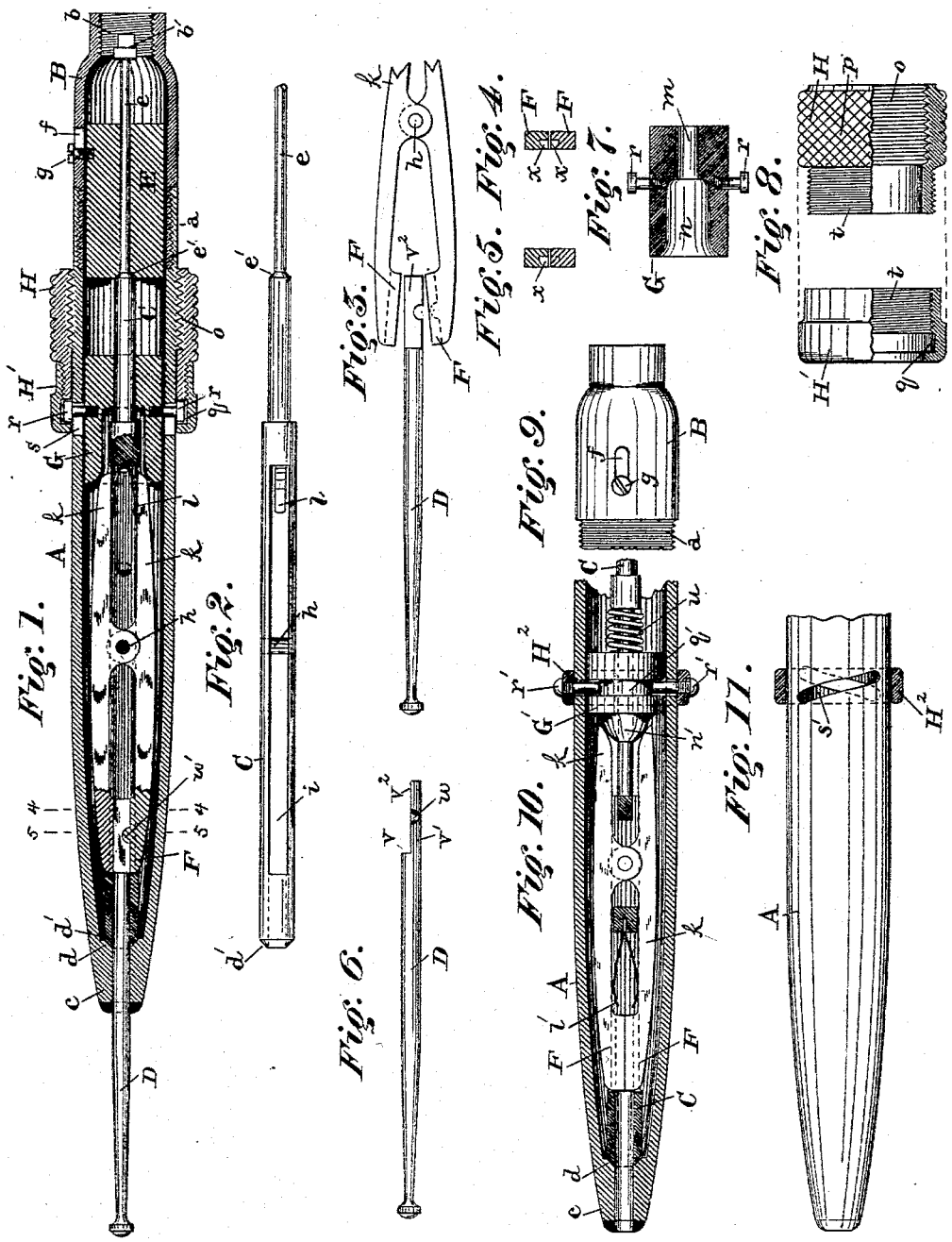

WILLIAM B. MANN, OF BALTIMORE, MARYLAND.

DENTAL-ENGINE HAND-PIECE.

SPECIFICATION forming part of Letters Patent No. 359,798, dated March 22, 1887.

Application filed October 28, 1886. Serial No. 217,408. (No model.)

*To all whom it may concern:*

Be it known that I, WILLIAM B. MANN, a citizen of the United States, residing at Baltimore, in the State of Maryland, have invented certain new and useful Improvements in Dental-Engine Hand-Pieces, of which the following is a specification.

My invention relates to hand-pieces for dental-engines, and has for its object to provide a superior hand-piece, one which in practice will meet all the requirements demanded of such devices.

The invention will first be described in connection with the accompanying drawings, and the subject-matter thereof will then be set forth in the claims.

The drawings illustrate the construction of the several features of my improvements.

Figure 1 is a longitudinal central section through a hand-piece embracing my improvements. Fig. 2 is a view of the spindle. Fig. 3 is a view of two grip-jaws and a tool in position to be gripped thereby. Fig. 4 is a cross-section of the two grip-jaws on the line 4 4. Fig. 5 is a cross-section of the two grip-jaws on the line 5 5. Fig. 6 is a side view of a tool. Fig. 7 is a longitudinal section of the compressor-slide which opens the grip-jaws, on the plan shown in Fig. 1. Fig. 8 shows the two parts of the screw-threaded collar for actuating the compressor-slide which opens the grip-jaws. Fig. 9 is a side view of the shank section of the case. Figs. 10 and 11 are longitudinal section and side views, respectively, of a portion of a hand-piece, and illustrate a modification of the spring and slide and collar by which the grip-jaws are actuated.

The tubular casing of the hand-piece is composed of two sections, the hand-section A and the shank-section B, which two parts are united by the screw-thread $a$. The shank-section at one end has a screw-thread, $b$, for connection with the end of the usual flexible sheath which surrounds a flexible shaft used in dental engines. The spindle C of the hand-piece is designed to have its end $b'$ secured to the said flexible shaft. Neither the sheath nor the flexible shaft are shown in the drawings, as they form no part of my present invention.

The nozzle end $c$ of the hand-piece has on its inner side a reamed-out or tapered bearing, $d$, against which the cone-pointed tubular end $d'$ of the spindle C rests. This end of the spindle is tubular and receives the shank end of the tool D. The spindle C extends longitudinally through the hand-piece casing, and has bearings therein, as hereinafter described. The rear part, $e$, of the spindle is reduced, or smaller in size, and a tapered or cone-shaped shoulder, $e'$, is turned at the point where the reduced part unites with the larger part. A movable bearing, E, occupies the shank section of the case, and is centrally bored to permit the reduced part $e$ of the spindle to pass through it. This bearing is adapted to slide longitudinally in the case B, and its front end bears against the said cone-shaped shoulder $e'$ and serves to keep the cone-pointed end $d'$ of the spindle snugly or properly in contact with the reamed-out bearing $d$ at the nozzle end. It will thus be seen that all lost motion or looseness of the spindle that may be occasioned by wear may be readily taken up by adjusting the movable bearing E. This adjustment may be effected by any convenient device. In the present instance the shank-section B has a longitudinal slot, $f$, and a screw, $g$, set in the movable bearing E, projects through the said slot. By tightening the screw $g$ its head will bind on the outside of the case B, and retain the bearing E wherever set. When the screw is loosened, the bearing E may be adjusted.

Two pivoted jaws, F, are employed to grip the shank end of the tool D. The shanks $k$ of these jaws are both pivoted to the spindle C at a point, $h$, back of its tubular end, where the spindle has a slot, $i$, (see Fig. 2,) which is occupied by the two jaws F when they are gripping the tool-shank. This will be understood by reference to Figs. 1 and 2. When thus gripped, the tool-shank occupies the tubular end $d'$ of the spindle, and the jaws which grip it are closed together in the slot $i$ of the spindle, and thereby are prevented from lateral movement or slipping, and consequently they hold the tool with great firmness.

The slot $i$ in the spindle need not extend the length shown in the drawings. It would be sufficient if the slot were adjacent to the tubular end and long enough only to admit the jaws F when closed together.

Means to close the grip-jaws and means to open them are employed. Two plans to this end are shown. The rear ends of the jaw-shanks $k$ extend back from the point $h$, and a spring, $l$, (see Figs. 1 and 2,) secured to the spindle C, presses against the said jaw-shanks, and by spreading them apart serves normally to close the jaws F on the tool-shank. A sliding compressor, G, (see Figs. 1 and 7,) occupies the case, and has a center bore, $m$, through which the spindle C passes. This compressor therefore serves as a bearing to steady the rotating spindle. The front end of the compressor has a bell-shaped socket, $n$, and the extremities of the jaw-shanks $k$ are in position to enter this socket, which they do when the compressor G is crowded forward. When this forward movement of the compressor takes place, the result is to compress the two jaw-shanks $k$ together, and thereby open the jaws F and release the tool. By providing the two pivoted jaws with rear end shanks extending back from the pivot, a very slight movement of the compressor G will operate the jaws.

The sliding compressor G is moved forward and back by the exterior screw-thread collar H H'. (See Fig. 1.) This collar is made in two parts, which are shown together in Fig. 1 and separate in Fig. 8. One part, H, has an internal screw-thread, $o$, which takes on an external screw-thread on the case A, and also has an exterior knurl or rough surface, $p$, by which it may be grasped. The other part, H', of the collar has an internal annular groove, $q$, which receives the head of two or more screws, $r$, which are set in the sliding compressor G. Each of these screws project outward through a longitudinal slot, $s$, in the case A. Instead of the screws $r$, pins may be used. The two parts, H and H', of the collar are coupled together by any suitable means—in the present instance by a screw-connection, $t$. From this description it will be understood that by grasping the rough surface of the collar H and turning it, it will be moved according to the direction in which it is turned, either forward or back, on the case A, and the compressor G within the case will be made to slide in like manner. It will thus be understood that Fig. 1 illustrates one plan or one construction of parts for actuating the grip-jaws F. In this plan the spring $l$ closes the jaws and the slide G opens them. Another plan for effecting this end is shown in Figs. 10 and 11, and is the equivalent of the one just described. Here the action of the parts is reversed. The spring $l'$ opens the jaws and the slide G' closes them. In this plan the slide G' has a center bore for the passage of the spindle, and an external annular groove, $q'$. The front end of the slide has a rounded protuberance or cone-point, $n'$, and the extremities of the jaw-shanks $k$ are in position to be spread apart by said cone-point when the slide is crowded forward, and when this forward movement takes place the jaws F will be closed. The slide G' is moved forward and back by the following means: An exterior collar, H², has two pins, $r'$, each of which projects inward through a spiral slot, $s'$, in the case A and into the annular groove $q'$ on the slide. By partly turning the collar H² one way or the other, the slide G' will be moved, as desired, either forward or back. A spring, $u$, around the spindle keeps the slide G' pressed forward. The pivoted grip-jaws F, attached to a spindle, in combination with the nozzle end $c$ of the hand-piece, comprises a useful device for holding the shank end of a tool without regard to the tubular end of the spindle or the slot in the spindle.

The grip-jaws F have a peculiar shape, to fit the shank end of the tool D. This end, as shown at $v$, is halved. The outer side, $v'$, is rounded, and the inner side, $v^2$, is flat. The end also has a notch, $w$. The shape of the jaws corresponds to that of the shank end $v$. In the grip-face of each jaw is a groove, $x$, and one of them has in its groove a lug, $w'$, to enter the notch in the shank end. This construction of the grip-jaws prevents the tool from turning or drawing out.

The two pivoted grip-jaws here shown and the coacting parts differ in their shape, construction, and manner of operating from the two flat spring tool-locking devices heretofore used, and also from the single tool-locking latch pivoted midway of its two ends heretofore used.

Having described my invention, I claim and desire to secure by Letters Patent of the United States—

1. The combination of the tubular casing provided with a nozzle end, a spindle extending longitudinally through and turning in bearings in the tubular casing, two grip-jaws pivoted to the spindle and each jaw having a rear end shank extending back from the pivot, and means, substantially as described, acting on the said rear end shanks to operate the jaws, for the purpose set forth.

2. The combination of the tubular casing provided with a nozzle end, a spindle extending longitudinally through and turning in bearings in the tubular casing, two grip-jaws pivoted to the spindle, each jaw having in its face a longitudinal groove, one side of which is partly rounded and the other flat, whereby the tool is prevented from turning, and one jaw having a cross-lug, $w'$, in its groove, whereby the tool is prevented from drawing out, as set forth.

In testimony whereof I affix my signature in the presence of two witnesses.

WM. B. MANN.

Witnesses:
JOHN E. MORRIS,
JNO. T. MADDOX.